Aug. 29, 1944.   J. F. DRESCHER   2,356,920
GLIDER COUPLING
Filed Aug. 27, 1943   5 Sheets-Sheet 1
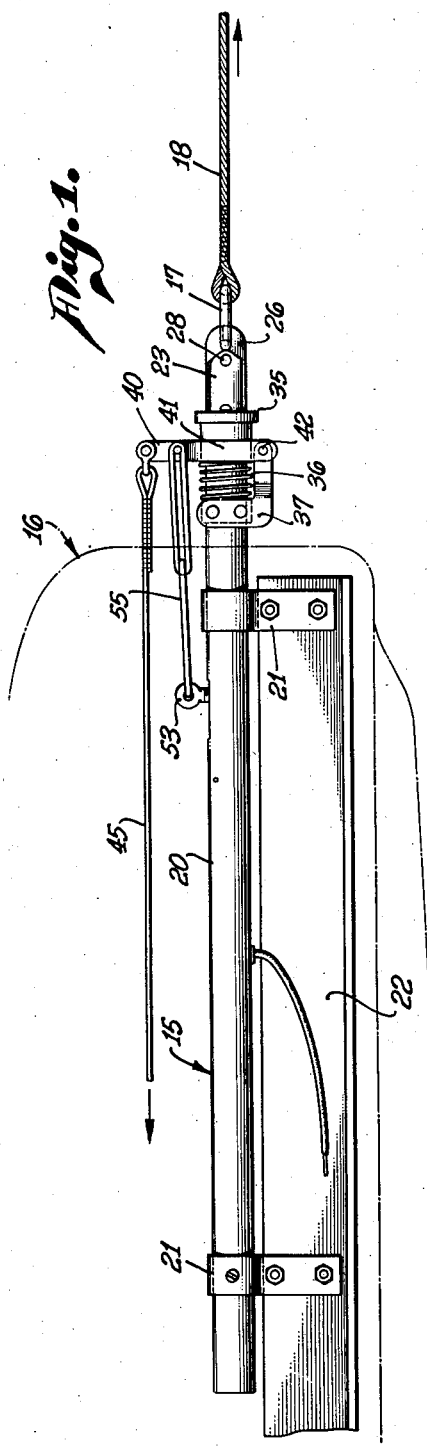
JOHN F. DRESCHER,
INVENTOR.
BY
ATTORNEY.

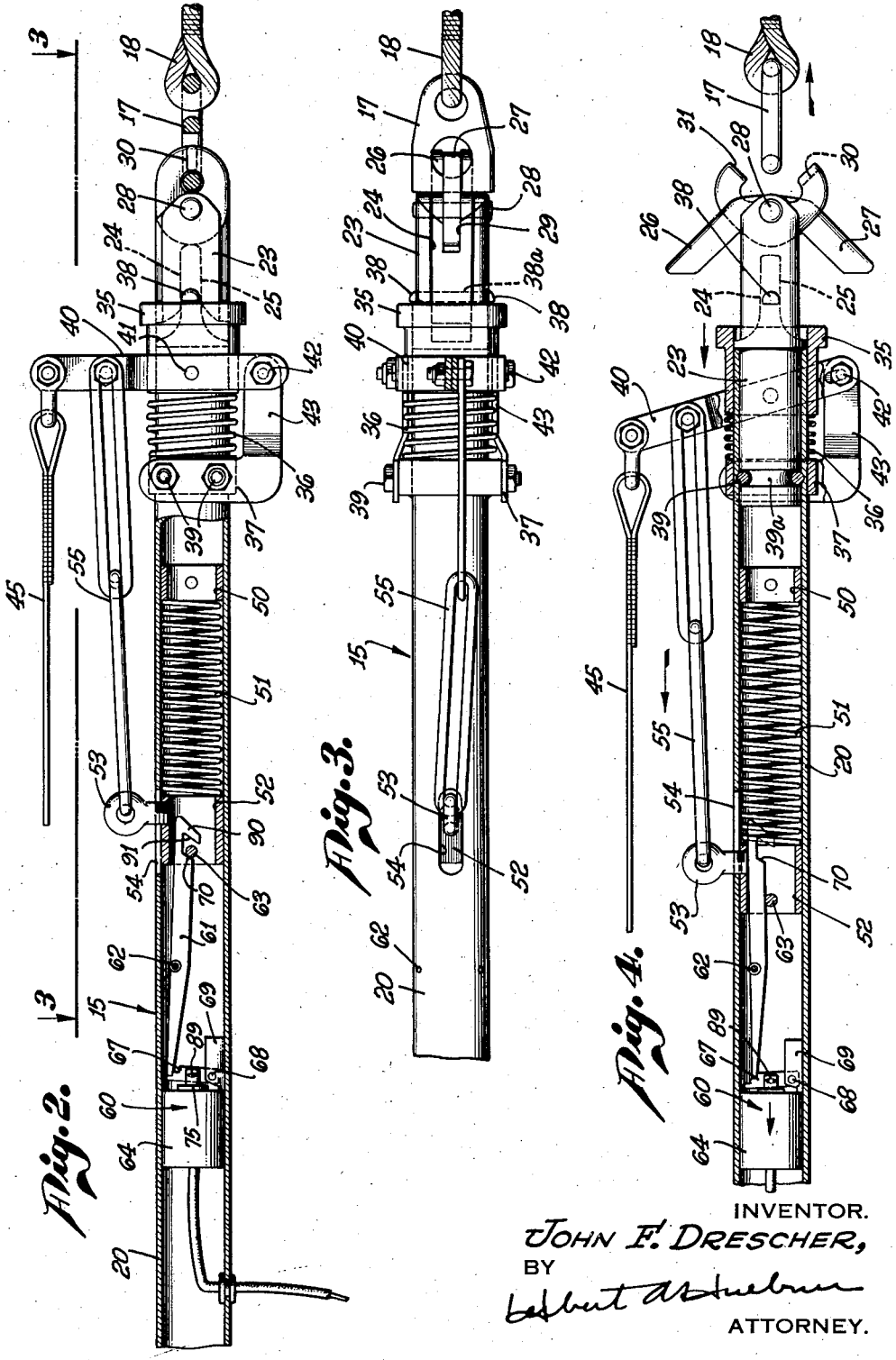

Aug. 29, 1944.   J. F. DRESCHER   2,356,920
GLIDER COUPLING
Filed Aug. 27, 1943   5 Sheets-Sheet 3
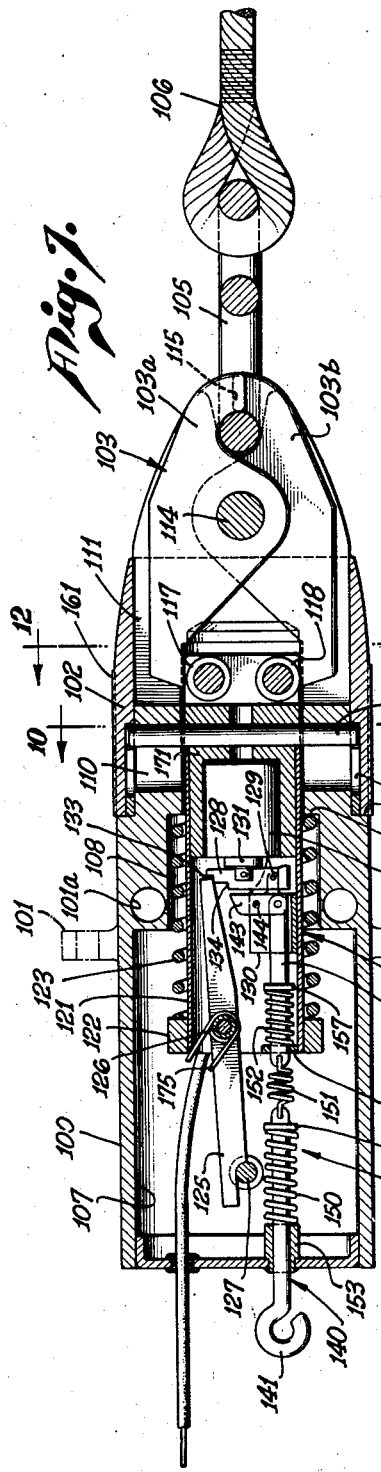
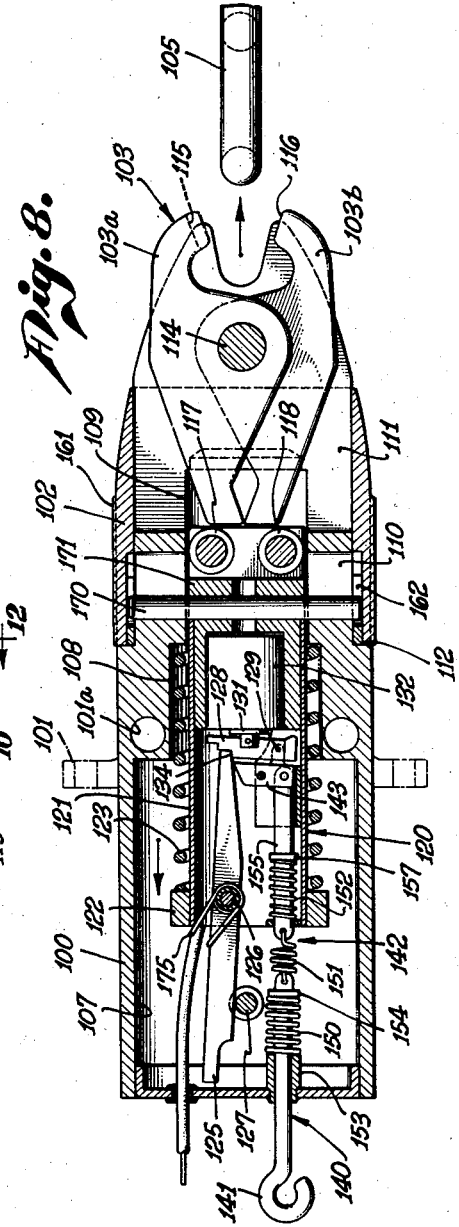
JOHN F. DRESCHER,
INVENTOR.
BY
ATTORNEY.

Aug. 29, 1944.   J. F. DRESCHER   2,356,920
GLIDER COUPLING
Filed Aug. 27, 1943   5 Sheets-Sheet 4
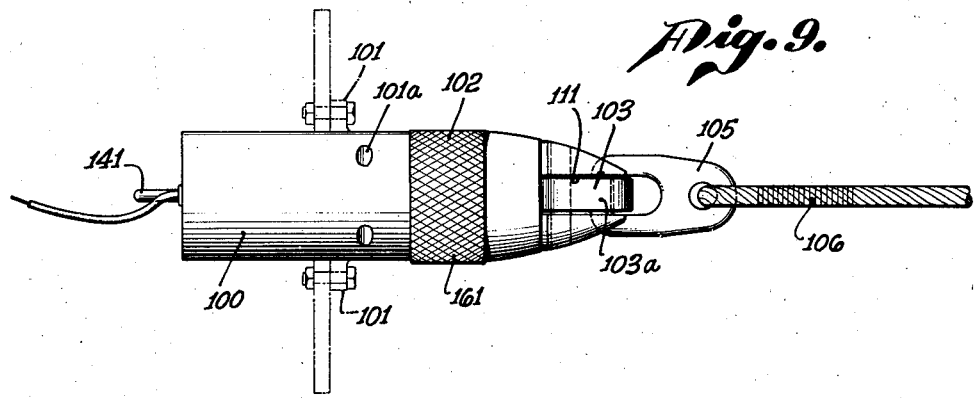
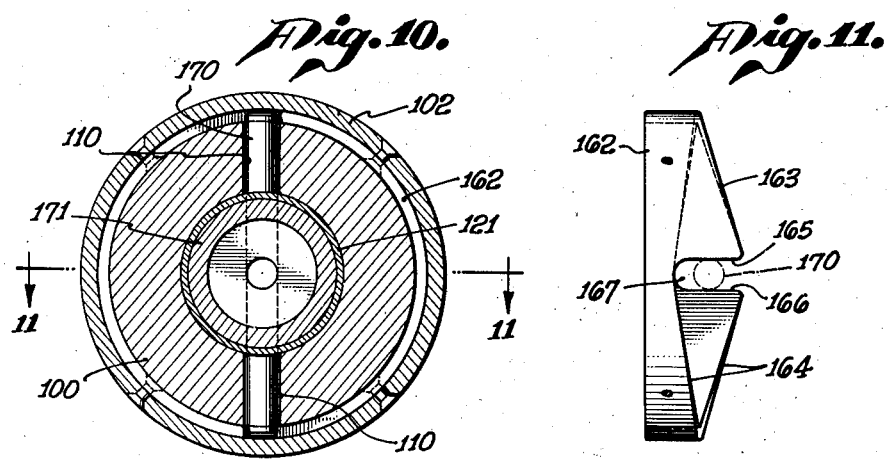
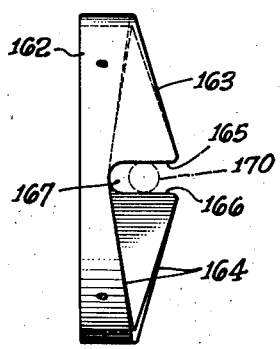
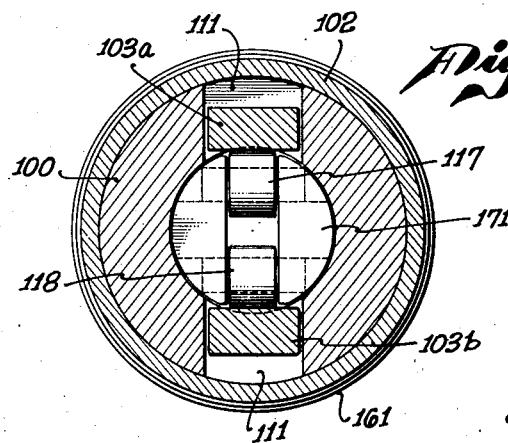
John F. Drescher,
INVENTOR.
BY
ATTORNEY.

Aug. 29, 1944.                J. F. DRESCHER                2,356,920
                               GLIDER COUPLING
                           Filed Aug. 27, 1943         5 Sheets-Sheet 5
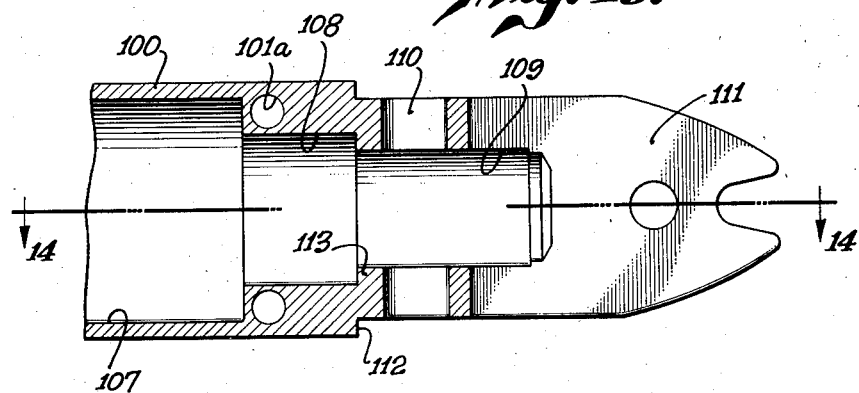
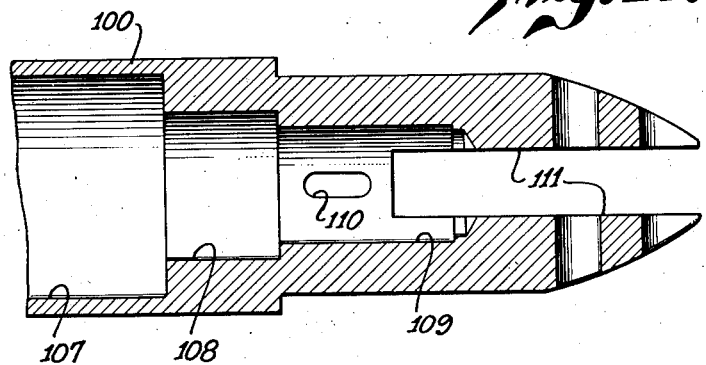
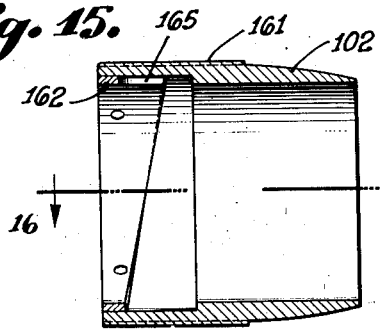
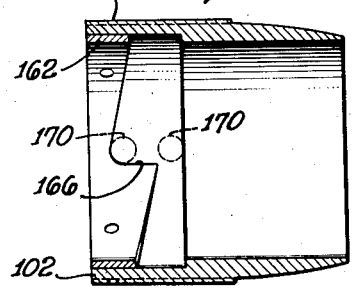
JOHN F. DRESCHER,
INVENTOR.
BY
ATTORNEY.

Patented Aug. 29, 1944

2,356,920

UNITED STATES PATENT OFFICE 2,356,920

GLIDER COUPLING

John F. Drescher, Los Angeles, Calif.

Application August 27, 1943, Serial No. 500,300

20 Claims. (Cl. 280—33.15)

This invention relates to a releasable coupling for towing gliders behind airplanes or behind other gliders. It is conventional to employ for such purposes a manually operated quick detachable coupling associated with a towing bar. The bar is mounted either in the nose of the glider or the tail of the airplane, or in both, whereby the towing cable may be instantly released from either craft or from both of them. Manual release is attained by pulling on a cable. This has some disadvantages, namely a cable of any length to a remote part of the glider adds weight and opportunity for fouling and moreover is usually operable only from one position in the glider.

It is a primary object of my invention to provide an electrical release for a glider towing bar coupling. It may be wired for operation from any of several locations in the glider, or connected through the agency of the towing cable for remote control in the towing airplane, or may be augmented by a radio control.

A further object of the invention is to provide an electrical release which may be installed in a conventional glider towing bar without materially modifying the external physical design or proportions of such bar. It is possible to install a battery for operating the release in the bar itself, but this is not normally necessary as the glider is usually equipped with an electrical system. Very slight external appendages are required, and the electrical mechanism is exceptionally light in weight and compact.

A further object of my invention, in a modified form, is to provide a glider coupling of completely novel construction and improved operation useful for the same type of duty as is the first form, but designed to satisfactorily operate under a much heavier load than is feasible with the first form.

Further objects of my modified form of invention are to incorporate a novel form of coupling jaw in which the normal draft pressure at the rear ends of the jaw is imposed upon roller bearings which may be withdrawn upon either electrical or manual release to free the parts of the jaw for opening to release the cable.

A still further object of the modified form of invention is to provide a coupling of the character described in which there are no laterally projecting operating parts, the mechanism being housed within a streamlined or bullet type of shell whereby installation is facilitated and external operating parts are reduced to a minimum and present only at the nose and tail of the device.

These and additional objects of my invention in both forms will become more apparent from a further consideration of the description and drawings.

In the drawings:

Figure 1 is a side elevational view of a towing bar coupling embodying my invention, mounted in the nose of a glider.

Figure 2 is a vertical sectional view of the towing bar coupling showing the mechanism in locked position.

Figure 3 is a top plan view of the bar with the parts in the same position as in Figure 2.

Figure 4 is a vertical sectional view similar to Figure 2 showing the mechanism in releasing position.

Figure 5 is an enlarged fragmentary vertical sectional view illustrating an operating solenoid and immediately associated parts of my device.

Figure 6 is a cross-sectional view taken on the line 6—6 of Figure 5.

Figure 7 is a longitudinal sectional view of a modified form of my invention showing the mechanism in locked position.

Figure 8 is a view similar to Figure 7 showing the mechanism in releasing position.

Figure 9 is a top plan view of the modified form of my device illustrating its relationship to a mounting in the glider and a towing cable.

Figure 10 is a cross-sectional view taken on the line 10—10 of Figure 7.

Figure 11 is a side elevation of a setting cam device taken in the direction of the arrows 11 in Figure 10.

Figure 12 is a cross-sectional view taken on the line 12—12 of Figure 7.

Figure 13 is a vertical sectional view through the forward region of the shell housing the mechanism of the modified form.

Figure 14 is a horizontal sectional view of the same region, taken on the line 14—14 of Figure 13.

Figure 15 is a vertical sectional view of a setting ring for operating the cam.

Figure 16 is another sectional view of the same taken on the line 16—16 of Figure 15.

Referring to the form of invention illustrated in Figures 1 to 6, the towing device 15 is shown installed in a glider 16, and retaining the ring 17 of a towing cable 18.

The device 15 comprises an elongated sleeve or tube 20 provided with any suitable mounting means such as clamps 21 which may be bolted to any suitable element of the glider, as for example a frame piece 22.

Mounted to swivel within the forward end of the tube 20 is a coupling head 23 formed with diametrically opposed longitudinal slots 24 and 25. The slotted head is bifurcated at its forward end to receive the shoulders of a pair of cooperating jaw members 26 and 27 which are pivotally mounted by means of pivot pin 28. The opposed slots 24 and 25 are the same width as, and merge into the end bifurcation. Thus the shoulders of the jaw members are disposed within the bifurcation, and the rear ends of these members may be received in the slots. The jaw member 26 is centrally slotted as at 29 to receive the shoulder of the narrower jaw member 27. The forward end of the jaw member 26 is also recessed as at 30 to provide an interlocking contact with the forward end 31 of the jaw member 27 whereby when the jaws are closed the ring 17 is retained therebetween.

It is obvious from the illustration, that the jaws are mounted scissors fashion so that if the rear ends thereof are held closed the front ends will be likewise closed.

The rear ends of the jaws are retained in closed position in the slots 24 and 25 by a sliding collar 35 urged forward by a compression spring 36 the rear end of which abuts against a bracket 37. Forward movement of the collar 35 is limited by oppositely disposed lugs 38 which may be the ends or heads of a pin 38a extending through the coupling head.

The bracket 37 is secured upon the tube 20 by a pair of bolts 39 which pass through the tube. These bolts are tangential to a groove 39a in the rear end of the head 23 whereby the swivel connection between the head and the tube previously referred to is attained.

A yoke 40 is pivotally mounted by pins 41 on the sliding collar 35, and is pivotally anchored at its lower end upon a bolt 42 extending between horizontal projections 43 of the bracket 37. A cable 45 is attached to the upper end of the yoke 40, and by pulling on the cable 45 the slidable collar 35 may be withdrawn against action of the spring 36 to free the jaws 26 and 27.

The foregoing combination of elements which has been somewhat briefly described, embodies a substantially conventional manually or cable operated glider towbar or coupling.

My invention resides in the application of an electrical releasing mechanism in combination with the foregoing, incorporating some necessary modification of the conventional coupling, and the invention also embraces the electrical mechanism per se. By the term electrical mechanism, I imply the necessary associated mechanical parts, and the whole may be designated an electrically operated mechanism.

A stop member 50 is riveted, bolted, welded, or otherwise secured in the tube 20 near the bracket 37. This stop member provides an abutment for a strong compression spring 51. The compression spring 51 must be ample to overcome the resistance of the other spring 36 as well as the frictional resistance offered by the coupling parts in closed position when sliding the collar 35 from locking to releasing position.

The rear end of the spring 51 engages a sliding hollow block 52. An eye bolt 53 which passes through a longitudinal slot 54 in the tube 20 is threaded into the block 52 and governs the reciprocal stroke of the block by engagement with opposite ends of the slot 54.

A telescoping linkage 55 interconnects the eye bolt 53 and the yoke 40.

When the sliding block 52 is at its forward position, as illustrated in Figure 2, the linkage 55 is slightly telescoped or at least exerts no pulling effect on the yoke 40, thus permitting the spring 36 to advance the collar 35 into its forward or locking position. When the sliding block 52 is forced by the spring 51 to its rearward position, as illustrated in Figure 4, the link 55 pulls the yoke 40 forward against compression of the spring 36 and retracts the collar 35 into unlocked or releasing position.

If the sliding block is unrestrained the spring 51 will shift it rearwardly for such purpose. This block is held in its forward position (Figure 2) and released for rearward shifting (Figure 4) by my electrically operated mechanism generally designated by the reference numeral 60.

This mechanism comprises a trigger 61 pivotally mounted at 62 within the tube, adapted to engage a latch pin 63 in the sliding block 52, and controlled by a solenoid 64.

The rear end of the trigger 61 is supportable on either one of two steps 65 and 66 of a rocker arm 67 which is pivotally mounted at 68 in a slotted mounting 69. When the trigger rests on the upper step 65 as illustrated in Figures 2 and 5, an oblique face 70 at the forward end of the trigger engages the pin 63 in the sliding block 52 and restrains the block from shifting rearwardly under influence of the spring 51. When the trigger is permitted to drop to the second or lower step 66 the force of the spring 51 urges the block 52 rearwardly and the pin 63 pushes against the trigger face 70 with a cam action elevating the forward end of the trigger and permitting the pin 63 to pass into the position shown in Figure 4.

The rocker arm 67 is normally retained in a forward position, as shown in Figures 2 and 5, wherein the trigger must rest on the upper step 65, by the solenoid armature 75 which is coupled to the rocker arm 67 (as later described) and is advanced by an internal solenoid spring 76. Thus when the solenoid remains deenergized the trigger is maintained in restraining position and when the solenoid is energized the rocker arm 67 is shifted, permitting the rear end of the trigger to fall, and releasing the pin 63, which in turn through the various associated parts already described causes the collar 35 to shift rearwardly and unlock the jaws 26 and 27.

I employ a novel solenoid, some of the features of which are disclosed in my copending application for Bomb Shackle filed December 15, 1942, Serial No. 469,077. It comprises a soft steel core 80 having a relatively wide flange base or end 81 and its opposite end terminating in a frustoconical tip 82. It is hollow for the purpose of accommodating the compression spring 76. The spring is bronze or other non-magnetic material. The cylindrical extension of the core is enclosed by a brass or non-magnetic tube 77 which is offset at one end to form a seat for an iron head 78. The winding 83 encircles the tube 77, and a metal case 84 encloses the parts described. The metal case 84 is cylindrical in shape to form a snug fit in the bore of the tube 20, thus facilitating installation in the tube and at the same time aiding in the dissipation of heat generated in the solenoid by dispersion thereof into the tube. An iron plunger or armature previously indicated by the reference numeral 75 is reciprocably located within the iron head 78 and the winding 83, is drawn in when the solenoid is energized, and returned by the spring 76 when de-energized. The iron plunger is formed at its inner end with a hollow cone 86 complementary to the frustoconical end 82 of the core, and has an ear 87 slotted to receive the pin 89 of the rocker arm 67.

The structure illustrated and described is compact, operates with a light spring, requires a minimum of current, is easily mounted within the cylindrical tube 20 and insures rapid and effective dissipation of heat.

The forward end of the trigger is formed with a hook element 90 having an inclined face 91, the latter of which functions in connection with the cocking of the device.

In operation, assuming that the electrically operating releasing mechanism is cocked, the ring 17 may be inserted in the jaws while the collar 35 is manually retracted, the rear portions of the jaws are seated in the grooves of the coupling head, and the collar is allowed to advance under influence of the spring 36 into locking position.

In order to cock the electrically operated releasing mechanism the block 52 is slid forward against compression of the spring 51 by exerting pressure on the eye bolt 53. It is noted that the slot 54 is somewhat longer than necessary for the final cocked position of the eye bolt to permit a slight over-travel of the eye bolt. In this over-travel of the eye bolt the pin 63 in the block 52 is brought against the inclined face 91 of the forward end of the trigger and the cam action of the pin on the trigger face draws the forward end of the trigger down thereby elevating the rear end of the trigger, and the spring 76 in the solenoid forces the plunger outwardly thereby tipping the rocker arm 67 forwardly so that the rear end of the trigger comes to rest in the upper step 65 of the rocker arm. Thereupon pressure on the eye bolt may be released and it will slide slightly toward the rear until the pin 63 comes into locking engagement with the face 70 of the trigger.

The mechanism will remain in the locked and cocked position, and the jaws may be freed for uncoupling the tow cable ring either by pulling on the cable 45 as previously described, or by energizing the solenoid, in which latter case the rear end of the trigger is permitted to drop from the upper step 65 to the lower step 66 thereby freeing the pin 63 so that the sliding block 52 may shift rearwardly under influence of the spring 51 and consequently through the eye bolt 53 and the link 55 draw the yoke 40 rearwardly, which retracts the collar 35 and thereby releases the jaws.

An electrical release of the character which I disclose and claim has the advantages not only of being controllable from any desired point in the glider but also remotely from the glider by means of, for example, electrical cable connection to the towing airplane, or even by radio, assuming a suitable control device in connection with the electrically operated mechanism by which the solenoid will be energized.

The modified form of my invention is shown in Figures 7 to 16 inclusive. As before indicated, it is more compact than the other form and is constructed for much heavier duty.

Referring to Figure 9 my modified device comprises externally a shell 100 formed with a mounting flange 101, and optional mounting bolt holes 101a, and embodying a cocking collar 102 and coupling jaws 103. These jaws engage a ring 105 of a towing cable 106.

The shell 100 has an overall configuration similar to that of a bullet. It provides a cylindrical chamber 107 with extending cylindrical recesses 108, and 109, and is formed with a vertical slot 110, and a forward vertical slot 111. The shell 100 is reduced in external diameter from a shoulder 112 to the forward end for purposes hereinafter described, and there is an intermediate annular flange 113 the purpose of which will also become more fully apparent.

The jaws 103 will be for convenience identified as an upper jaw 103a and a lower jaw 103b. They are pivotally mounted upon a heavy pin 114 within the slot 111 of the shell. Jaw 103a is formed with a recess 115 adapted to receive the extreme end or lip 116 of the jaw 103b for the purpose of interlocking the jaws when closed and thus retaining the ring 105 therebetween; the jaws are locked by spreading the rear ends thereof which is accomplished by roller bearings 117 and 118.

These roller bearings are mounted at the forward end of a slide assembly 120 which has a sliding fit within the flange 113 and recess or bore 109.

When the slide assembly 120 is forward, as in the position shown in Figure 7, the roller bearings engage the jaws and the jaws are locked. When the assembly is rearward as shown in Figure 8 the roller bearings are free of the jaws and the jaws open as shown in Figure 8.

The assembly 120 comprises a cylindrical sleeve 121 provided at its rear end with a collar 122 against which one end of a spring 123 abuts. The opposite end of the spring presses against the wall of the flange 113. The normal tendency of the spring, and it has sufficient strength for the purpose, is to shift the assembly 120 rearwardly for unlocking the jaws. It can be restrained for keeping the jaws in locked position by a trigger 125.

This trigger is pivotally mounted in the sleeve 121 at 126. The rear end of the trigger is recessed to engage a latch pin 127 which is diametrically positioned in the shell 100, and the forward end is adapted to engage a rocker arm 128. The rocker arm is pivoted at 129 on a bracket 130 and is adapted to be actuated by a plunger 131 of a solenoid 132. This solenoid is the same type as that described in more detail in the other form of the invention. Likewise the rocker arm 128 is formed with an upper step 133 and a lower step 134. When the forward end of the trigger rests on the upper step 133 the rear end is held in engagement with the latch pin 127. When the solenoid is energized to swing the rocker arm so that the forward end of the trigger drops into the lower step 134 the rear end of the trigger is freed to escape past the latching pin 127 and the shiftable assembly 120 will move rearwardly under influence of the spring 123.

The same action may be accomplished manually by a manual release 140. This comprises a rod 141 to which is coupled a linkage generally designated 142 which is pivotally connected to a pawl 143. The latter is pivotally mounted at 144 on the bracket 130. When the rod is pulled in a left hand direction, as shown in Figure 7, this causes the pawl 143 to rotate and the upper end thereof to engage the rocker arm 128 for rotating same clockwise, the same as if the rocker arm were thus actuated by energizing the solenoid. The linkage 142 includes three springs 150, 151, and 152. Of these, spring 150 is the strongest, spring 151 is of medium strength and spring 152 is the weakest. Spring 150 extends between the shoulder of a bearing bushing 153 and a flange 154 at the end of the rod 141. Spring 151 links rod 141 and a shaft 155. Spring 152 is disposed between a stop member 156 mounted in the sleeve 121 and a stop member 157 on the shaft 155.

The purpose of this combination spring, rod and shaft arrangement is to absorb over-drive of the rod 141 and thus protect the more delicate operating mechanism such as the pawl 143, etc. from injury, also to provide flexibility when the slide assembly shifts rearwardly.

In the first place, tension of the spring 150 must be initially overcome in shifting the rod 141. When its resistance is overcome the medium strength spring 151 shifts the shaft 155 against tension of the weakest spring 152. Thus shocks are absorbed, and the springs not only protect the more sensitive working parts against shock but are so adjusted in tension that after the initial movement of the rod 141 sufficient to actuate the pawl 143 and trip the trigger any further movement encounters heavy resistance especially by the strong spring 150.

Assuming the working parts are in the position shown in Figure 8, in unlocked or uncoupled position, and it is desired to couple a towing cable-ring, the ring may be inserted in the jaws and the jaws closed over the ring manually. While thus held, it is necessary to lock and cock the device by advancing the slide assembly 120 so that the roller bearings 117 and 118 engage the rear ends of the jaws and are held in that position. This means that the assembly 120 must be moved forwardly against opposition of the compression spring 123.

I provide for this by a manually actuatable cam arrangement which will next be described.

The rotatable sleeve or cocking ring 102 is mounted on the forward reduced end portion of the shell 100 which begins at the shoulder 112. This ring has an external knurled portion 161 to facilitate gripping thereof. The ring is riveted to a circular cam 162. This cam has complementary inclined surfaces 163 and 164 each describing an arc almost of 180 degrees and terminating abruptly at 165 and 166 in diametrically opposite shoulders so that they in effect form a slot 167.

The faces of the cam are adapted to engage a pin 170 which is mounted transversely through a block 171 rigidly secured within the sleeve 121 and forming part of the shiftable assembly 120. The pin 170 is adapted to move longitudinally of the shell within the limits of the slot 109 in the shell 100.

For locking and cocking the coupling, the ring 160 is rotated approximately a half turn which causes the cam surfaces to engage the pin 170 thereby forcing the assembly 120 forwardly into the position shown in Figure 7.

When the cam reaches its peak of movement there is adequate clearance for the notched rear end of the trigger 125 to engage the latch pin 127. The trigger is assisted by a wire spring 175, and is overbalanced at the rear end in addition. The spring in the solenoid shifts the plunger rearwardly to move the rocker arm 128 toward the trigger so that the trigger comes to rest in the upper step 133 of the rocker arm. The ring is rotated beyond the peak action of the cam so that the pin 170 is positioned in what I have described as the slot 167 which may be otherwise explained as the lowest depression in the cam, necessary for freedom of movement of the pin 170 when the coupling is again actuated for release.

Although I have herein shown and described my invention in what I have conceived to be the most practical and preferred embodiment, it is recognized that departures may be made therefrom within the scope of my invention, which is not to be limited to the details desclosed herein but is to be accorded the full scope of the claims so as to embrace any and all equivalent devices.

Having described my invention, what I claim as new and desire to secure by Letters Patent is:

1. A glider coupling comprising: a hollow tubular housing, pivotally mounted cooperating jaws on said housing for securing a tow cable, slidable means confining said jaws in closed relationship, means operable for sliding said slidable means permitting them to open and release said cable, and electrical means mounted inside said housing for actuating said sliding means.

2. A glider coupling comprising: a hollow housing member, jaws pivotally mounted at one end of said member and cooperating when closed to secure a tow cable, slidable means supported by said member engaging said jaws to hold them in closed relationship, a spring tensioned to slide said slidable means out of engagement with said jaws whereby said jaws are permitted to open and release said cable, trigger means normally restraining said spring, and a solenoid actuated means adapted to free said trigger means from its restraint of said spring.

3. A glider coupling comprising: a tubular sleeve, jaws pivotally mounted at one end of said sleeve and cooperating when closed to secure a tow cable, slidable means supported by said sleeve engaging said jaws to hold them in closed relationship, a spring within said sleeve tensioned to slide said slidable means out of engagement with said jaws whereby said jaws are permitted to open and release said cable, trigger means mounted in said sleeve which can be cocked to restrain said spring, and a solenoid actuated means mounted within said sleeve to free said trigger means from cocked position to release said spring.

4. A glider coupling comprising: a tubular sleeve, jaws pivotally mounted at one end of said sleeve and cooperating when closed to secure a tow cable, slidable means supported by said sleeve engaging said jaws to hold them in closed relationship, a spring within said sleeve tensioned to slide said slidable means out of engagement with said jaws whereby said jaws are permitted to open and release said cable, a trigger pivotally mounted in said sleeve one end being depressible to restrain said spring, a rocker arm pivotally mounted in said sleeve adapted to hold the opposite end of said trigger elevated to depress the spring restraining end, and a solenoid to shift said rocker arm and thereby remove support from the said opposite end of said trigger.

5. In a glider coupling comprising pivotally mounted cooperating jaws for securing a tow cable, a slidable collar adapted to embrace said jaws to hold them closed, a yoke connected to said sleeve, and a spring normally urging said yoke to hold said collar in jaw closing position; an electrically actuated release mechanism comprising: a spring interconnected with said yoke opposing said first named spring and having sufficient tension to overcome the latter and shift said collar to jaw releasing position, means to restrain said second named spring, and a solenoid actuated release cooperating with said means to remove the restraining action of same.

6. In a glider coupling comprising pivotally mounted cooperating jaws for securing a tow cable, a slidable collar adapted to embrace said jaws to hold them closed, a yoke connected to said sleeve, and a spring normally urging said yoke to hold said collar in jaw closing position; an electrically actuated release mechanism comprising: a spring interconnected with said yoke opposing said first named spring and having sufficient tension to overcome the latter and shift said collar to jaw releasing position, a trigger to restrain said second named spring, and a solenoid actuated release cooperating with said trigger to remove the restraining action of same.

7. In a glider coupling comprising pivotally mounted cooperating jaws for securing a tow cable, a slidable collar adapted to embrace said jaws to hold them closed, a yoke connected to said sleeve, and a spring normally urging said yoke to hold said collar in jaw closing position; an electrically actuated release mechanism comprising: a spring opposing said first named spring and having sufficient tension to overcome the latter and shift said collar to jaw releasing position, a shiftable block abutting said second named spring, a linkage interconnecting said block and said yoke, a latching device restraining said block, and a solenoid operated device for freeing said latching device.

8. In a glider coupling comprising pivotally mounted cooperating jaws for securing a tow cable, a slidable collar adapted to embrace said jaws to hold them closed, a yoke connected to said sleeve, and a spring normally urging said yoke to hold said collar in jaw closing position; an electrically actuated release mechanism comprising: a spring opposing said first named spring and having sufficient tension to overcome the latter and shift said collar to jaw releasing position, a shiftable block abutting said second named spring, a linkage interconnecting said block and said yoke, a pin on said block, a trigger engageable with said pin, a rocker arm adapted in one position to hold said trigger in engagement with said pin to restrain said block, and a solenoid operating said rocker arm to shift same to a second position in which said trigger is releaseable from said pin.

9. In a glider coupling comprising pivotally mounted cooperating jaws for securing a tow cable, a slidable collar adapted to embrace said jaws to hold them closed, a yoke connected to said sleeve, and a spring normally urging said yoke to hold said collar in jaw closing position; an electrically actuated release mechanism comprising: a spring opposing said first named spring and having sufficient tension to overcome the latter and shift said collar to jaw releasing position, a shiftable block abutting said second named spring, a linkage interconnecting said block and said yoke, a pin on said block, a pivotally mounted trigger having one end face engageable with said pin in cocked position, a rocker arm adapted in one position to hold said trigger end face in engagement with said pin to restrain said block in cocked position, a solenoid operating said rocker arm to shift same to a second position in which said trigger end face is releasable from said pin, and said trigger embodying an element engageable with said pin when said block is moved to cocking position to rock said trigger to cocked position.

10. In a device of the character described including a jaw releasing mechanism comprising a spring actuated slidable member within a housing, a pivoted trigger adapted to be cocked for restraining said member against the action of the spring, and a two step solenoid actuated rocker arm mechanism adapted to cock said trigger by engagement of one step with said trigger and to spring said trigger by shifting said mechanism so that the second step engages the trigger.

11. A coupling comprising: a housing, jaws pivoted on said housing and closable by spreading the rear ends of said jaws, a slidable member adapted in one position to be interposed between the rear ends of said jaws to hold the jaws closed, said member including two pins, each pin transversely disposed to one of said jaws and having a roller bearing thereon adapted to engage the rear end of the associated jaw, and means to slide said member free of engagement with said jaws whereby same may open.

12. A coupling comprising: a housing, jaws pivoted on said housing and closable by spreading the rear ends of said jaws, a slidable member adapted in one position to be interposed between the rear ends of said jaws to hold the jaws closed, and means to slide said member free of engagement with said jaws whereby same may open, said means comprising a spring, means to compress said spring into cocked position, a latching device for holding said spring cocked, and a releasing element to unlatch said device.

13. A coupling comprising: a housing, jaws pivoted on said housing and closable by spreading the rear ends of said jaws, a slidable member adapted in one position to be interposed between the rear ends of said jaws to hold the jaws closed, and means to slide said member free of engagement with said jaws whereby same may open, said means comprising a spring, means to compress said spring into cocked position including a cam bearing on said housing and engaging a part of said slidable member, a latching device for holding said spring cocked, and a releasing element to unlatch said device.

14. A coupling comprising: a housing, jaws pivoted on said housing and closable by spreading the rear ends of said jaws, a slidable member adapted in one position to be interposed between the rear ends of said jaws to hold the jaws closed, and means to slide said member free of engagement with said jaws whereby same may open, said means comprising a spring, means to compress said spring into cocked position including a cam bearing on said housing and engaging a part of said slidable member, a manually operable ring rotatable on said housing and associated with said cam to rotate same, a latching device for holding said spring cocked, and a releasing element to unlatch said device.

15. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, and means for tripping said latching mechanism.

16. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, said mechanism including a trigger when in cocked position interconnecting said housing and slidable member and holding said member in advanced position, and a solenoid actuated device for springing said trigger.

17. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, said mechanism including a trigger when in cocked position interconnecting said housing and slidable member and holding said member in advanced position, a rocker arm for holding said trigger in cocked position, and a solenoid for shifting said rocker arm to spring said trigger.

18. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, said mechanism including a trigger pivoted in said slidable member and when in cocked position engaging an element of said housing to hold said member in advanced position, and a solenoid actuated device for springing said trigger.

19. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, said mechanism including a trigger pivoted in said slidable member and when in cocked position engaging an element of said housing to hold said member in advanced position, a rocker arm on said member for holding said trigger in cocked position, and a solenoid for shifting said rocker arm to spring said trigger.

20. A coupling comprising: a tubular housing, jaws pivoted on said housing, a slidable member mounted in said housing holding said jaws closed when advanced and freeing said jaws to open when retracted, a spring coacting between said housing and said member to retract said member, means to advance said member and compress said spring comprising a cam engaging a part of said member and rotatable beyond peak of cam action to free said member for retraction, a latching mechanism restraining said member at the peak of said cam action, said mechanism including a trigger when in cocked position interconnecting said housing and slidable member and holding said member in advanced position, a rocker arm for holding said trigger in cocked position, a solenoid for shifting said rocker arm to spring said trigger, and an auxiliary manually operated pawl to shift said rocker arm to spring said trigger.

JOHN F. DRESCHER.